Patented Aug. 20, 1946

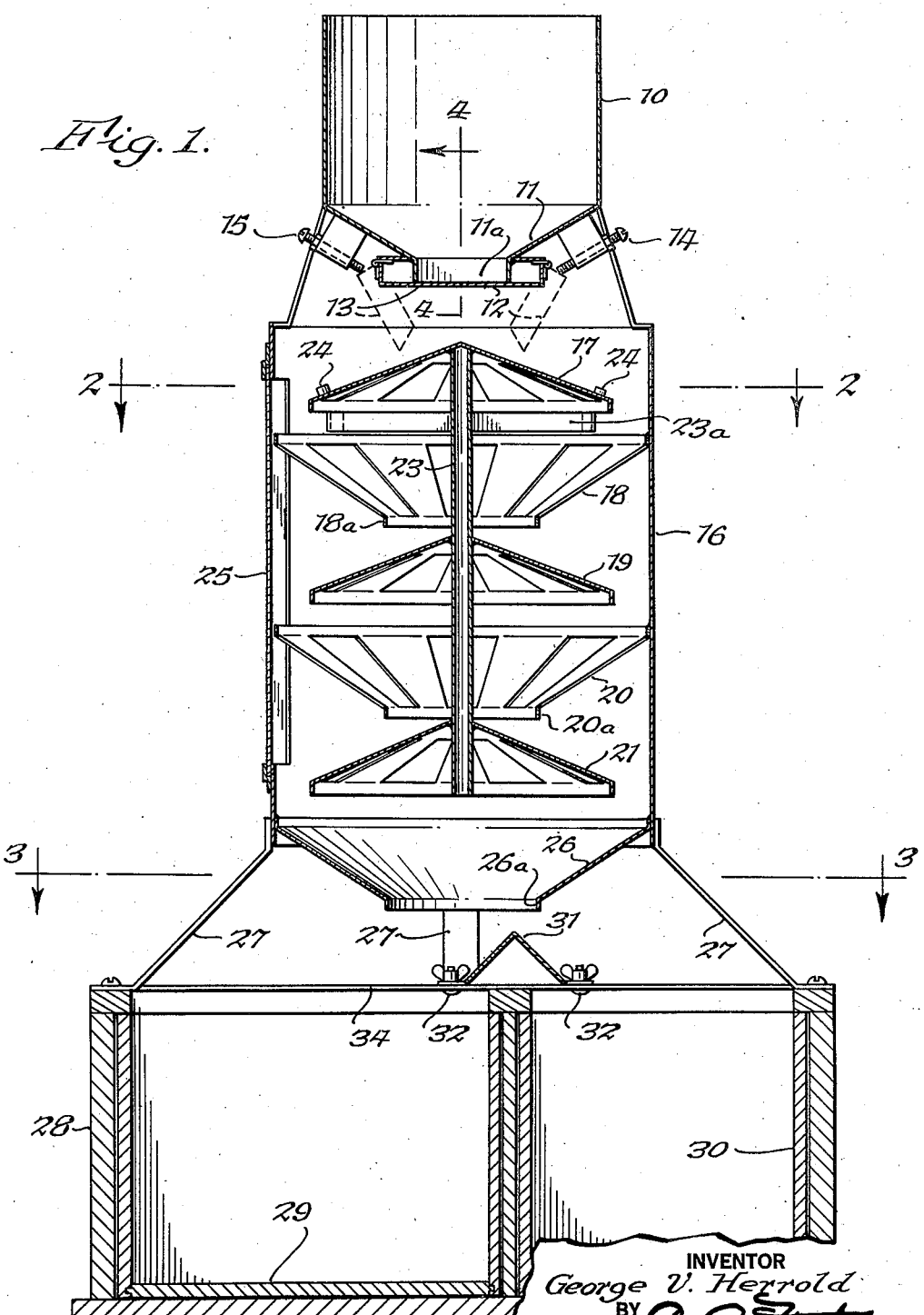

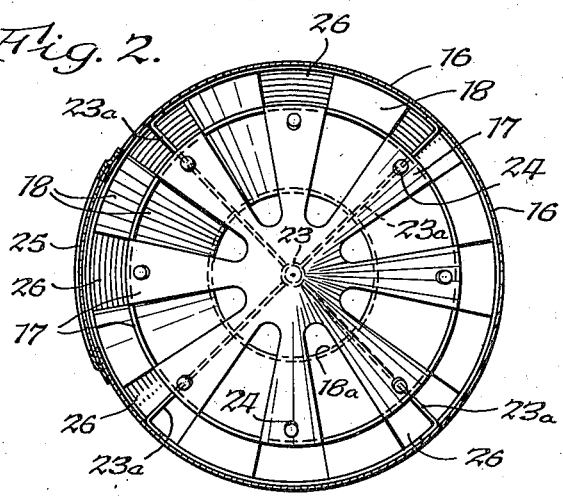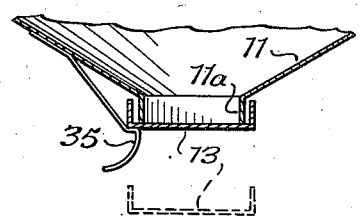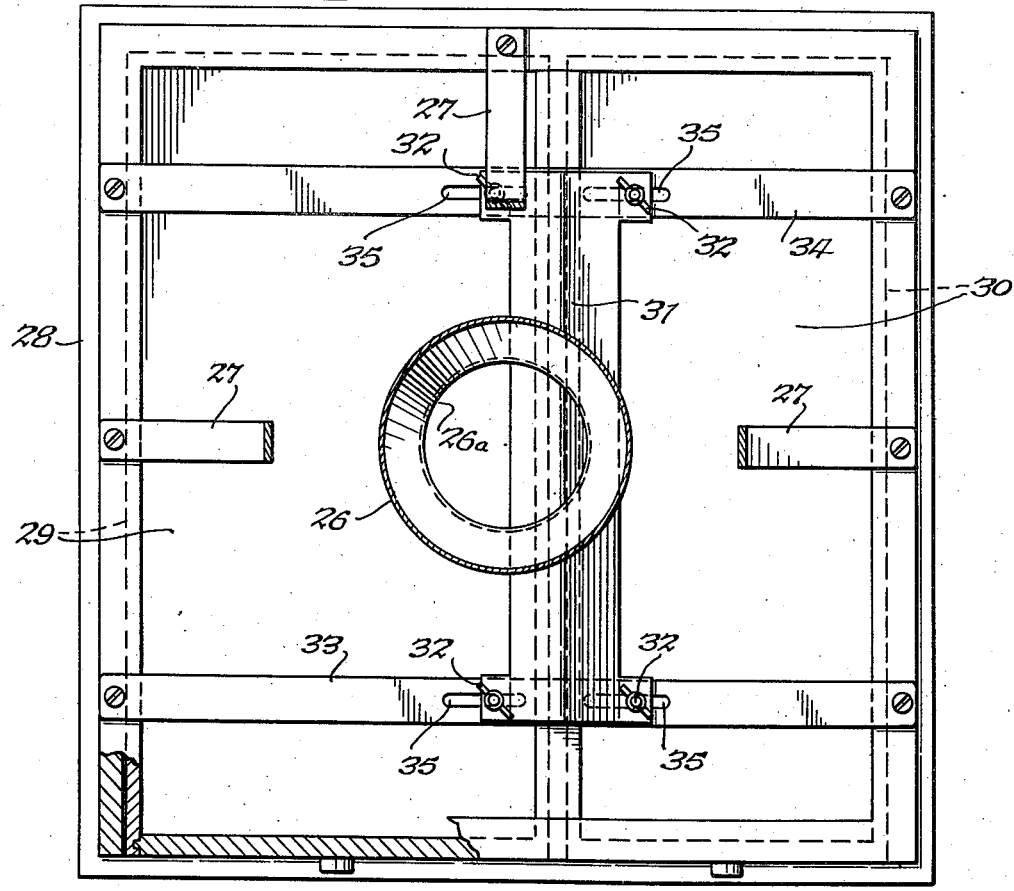

2,405,951

UNITED STATES PATENT OFFICE 2,405,951

RANDOM SAMPLING MACHINE

George V. Herrold, Buffalo, N. Y., assignor to Colonial Radio Corporation, Buffalo, N. Y.

Application July 27, 1945, Serial No. 607,370

3 Claims. (Cl. 73—421)

This invention relates to a random sampling machine; that is to say, a machine which will deliver a desired percentage of a quantity of material selected at random.

It is an object of this invention to provide a machine which is simple to construct, involves no rotating or otherwise moving parts, and requires no power to operate, which will deliver the desired percentage of bulk material selected at random.

It is a further object of this invention, to provide such a machine in which the material, if non-uniform, will be thoroughly mixed, to the extent that the percentage sample is representative of the entire bulk of material sampled.

It is a further object of this invention to provide such a machine capable of handling large quantities of material in a short time, and which is not liable to clogging or other troubles in operation.

It is a further object of this invention to provide such a machine which is readily adjustable to change the percentage value of the sample taken from the material passed through.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawings, in which Fig. 1 is a sectional elevation of a machine in accordance with my invention, Fig. 2 is a detail section on lines 2—2 of Fig. 1, Fig. 3 is a section on lines 3—3 of Fig. 1, and Fig. 4 is a section on lines 4—4 of Fig. 1.

The machine according to my invention is particularly adapted for use in industrial plants where "quality control," as it is known, is practiced. The principles and practice of quality control are relatively new and not widely understood, and for a better understanding of the subject, reference may be had to an article in "American Machinist," December 10 and 24, 1942, and in "Industrial Standardization," for April and May, 1943.

For the purposes of this specification, it may be stated that quality control is based upon close inspection of a relatively small percentage of small articles; such as, screw machine parts, rivets, small ceramic insulators, and other articles. Because it is in most cases impossible or impractical to make careful inspection of every individual article of this class, a small percentage only is closely inspected, and the findings of the result of this inspection are projected to the entire bulk of materials.

It will, therefore, be understood that the small percentage sample must be accurately representative of the entire bulk if the projected figures are to hold true. An example may make this clearer. Suppose that in a plant there are two screw machines, and each machine is operated by three different operators, one on the first shift, one on the second, and one on the third.

These machines may, and usually will, have their individual characteristics. Likewise, each operator may have his own particular characteristics influencing the quality of the work turned out. One operator, for instance, may set the machine up so that it occasionally delivers work which is slightly undersize. Another may set the machine so that its work is occasionally oversize. It is desired to know these facts, as well as to know when trouble develops in a machine which results in work being turned out which does not conform to specifications.

When the output of the various machines is collected at various times, it is usually thrown into a container. In the example given, suppose that after twenty-four hours of operation a keg of parts has been turned out. It might be supposed that a representative sample of the work could be obtained simply by plunging a scoop into the container and taking out a handful of parts at random. This is not necessarily true, and, as a matter of fact, generally is not true, because in filling the container the work is not thoroughly mixed, and various strata will usually be formed, each stratum containing only the work of one machine as operated by one operator.

Should a small number of parts be selected from the container in such a manner and closely inspected, and the results of this inspection projected to the entire bulk of the material, an entirely erroneous set of findings might, and usually will, result. It is, therefore, necessary that the work be thoroughly mixed before being sampled, and that the mixing take place in such a manner that any non-representative parts be uniformly dispersed throughout the entire bulk. If this is done, a small percentage sample selected at random will be truly representative of the entire bulk, and the findings can be projected for the entire bulk with complete confidence in their accuracy.

The machine according to my invention does the entire mixing and sampling operation, and will deliver a representative sample from nonhomogenous material, from which findings may safely be projected. In accordance with the principles of my invention, the entire bulk of the material is passed through my machine, wherein it is thoroughly mixed, and a small proportion of the output delivered from the machine is diverted into one container, this being the desired sample, while the remainder is delivered to another container.

This result is achieved without any moving parts, and without the use of any power, the parts simply being fed by gravity into the top of the machine and flowing out at the bottom. A series of perforated baffles is interposed in the flow of the material in such a manner that each particle follows a random path through the machine in accordance with the laws of probability, and all are subjected to a thorough mixing action. The output is delivered against a divider which may be adjustable so that more or less of the output is sent into one container and the remainder into another container, and the position of this divider may be calibrated in accordance with the percentage sample desired.

Referring now more particularly to the drawings, at the top of the machine I prefer to provide hopper 10, having conical bottom portion 11 and terminating in delivery opening 11a. The bottom of delivery opening 11a may be closed by hinged doors 12 and 13, normally held in closed position by spring latch 35 (Fig. 4), and adjustable stops may be provided for determining the maximum opening of doors 12 and 13, these, for instance, being in the form of bolts 14 and 15 carried in suitable screw threaded brackets mounted on conical bottom portion 11.

In Fig. 1 in full lines the doors are shown in closed position, whereas the dotted lines show the open position. It will be understood that to load the machine the doors are closed, in which position they are held by spring latch 35, and hopper 10 filled with the material to be sampled, after which latch 35 may be released and the doors will drop open, allowing the material to fall through opening 11a.

The mixing takes place within cylinder 16, carrying a number of baffle plates 17, 18, 19, 20, and 21, preferably conical in shape, for example. Baffles 17, 19, and 21 may be somewhat smaller in diameter than cylinder 16 so as to allow clearance for the material to be sampled between the baffles and the cylinder wall. These baffles may be faced upward and may be secured, as by soldering, to tubular member 23, and supported from wall 16 by concentric spider 23a, the outer extremities of which may be soldered to cylinder 16, and with the center soldered to tube 23.

Interposed between baffles 17 and 19, and 19 and 21, there may be provided additional baffles 18 and 20, these being likewise formed of conical members having an open apex, but mounted apex downward. Baffles 18 and 20 may be of large enough diameter to engage the inside wall of cylinder 16 and may fit in notches formed in cylinder 16, and may be soldered in position if desired, and they may be truncated and flanged as at 18a and 20a.

Each of the baffle plates is provided with a series of radially disposed openings, with the openings in each baffle plate staggered with respect to the openings of the next baffle plate so that in no case is there a clear space from the top of the cylinder 16 to the bottom, through which the material to be sampled may fall without being deflected.

To provide for deflecting objects sliding down top baffle 17, I prefer to provide a series of studs 24 centrally spaced between the openings and near the periphery of the baffle. Individual units of the sampled material striking these studs are deflected to one side or the other, aiding in thorough mixing.

The bottom of cylinder 16 may be closed by outlet cone 26, having a central discharge opening defined by flange 26a, and for purposes of visual inspection during the operation a window may be cut in one side of cylinder 16 and covered by a sheet of glass or transparent plastic 25.

Materials falling through the machine may be caught in one or the other of drawers 29 and 30 adapted to slide into and out of frame 28, on which the machine may be supported by means of legs 27 secured at their lower ends to frame 28 and at their upper ends to the bottom of cylinder 16.

In order to adjust the machine for the percentage sample desired, I may provide divider or separator 31 preferably in the form of a strip of metal extending across the discharge opening and bent to the form of an inverted V. This may be adjustably mounted on straps 33 and 34 secured to frame 28 and having adjusting slots 35. Divider 31 may be secured adjustably in position by means of thumb nuts and bolts 32 engaging straps 33 and 34.

It will be understood that by setting divider 31 so that its apex lies directly under the center of outlet cone 26 the quantity of material falling through the machine will be divided into two equal parts, and by moving the divider off center the percentage falling in one drawer will be increased while that falling into the other will be decreased. The percentage separation will be approximately equal to the area of outlet opening 26a lying to one side of the apex line of divider 31 and that lying to the other side, as will be clear from Fig. 3. If desired, a scale calibrated in percentages may be provided on straps 33 and 34, indicating the position at which the separator is to be set for any desired percentage sample.

Since it will practically always be desired to divide the material into a small or sample lot, and a relatively large residue, one drawer 29 may be made considerably larger than the other drawer 30, drawer 30, of course, being used to collect the sample and drawer 29 to collect the residue.

In operation, doors 12 and 13 are closed and hopper 10 filled. Drawers 29 and 30, if not already empty, are emptied, and latch 35 is tripped. The material will then flow out of hopper 10 and, down into cylinder 16. Some of it will impinge on baffle 17, and some will fall through the openings.

That falling through the openings will strike baffle 18, whereas that striking baffle 17 will be deflected one way or another, and will either fall through the openings or pass outside the periphery of baffle 17, striking baffle 18, and similarly will progress downward in an erratic manner through the machine through the action of gravity, passing baffles 18, 19, 20, and 21, and falling through outlet opening 26a against divider 31.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A random sampling machine comprising, in combination, a hopper, a cylindrical mixing chamber positioned below said hopper to be fed from said hopper, said chamber having a plurality of concentric conical material-deflecting plates alternately concave upward and concave downward having staggered openings for deflecting falling material in a random manner and for preventing unimpeded fall of material therethrough, an outlet opening for said chamber, and a divider positioned in the outlet path of the opening for dividing the output in a random manner into two batches of different size but of uniform make-up.

2. A random sampling machine comprising, in combination, a hopper, a cylindrical mixing chamber positioned below said hopper to be fed from said hopper, said chamber having a plurality of concentric conical material-deflecting plates of different diameter positioned alternately concave upward and concave downward, and having staggered openings for deflecting falling material in a random manner and preventing unimpeded falling of material therethrough, an outlet opening for said chamber, and a divider positioned in the outlet path for dividing the output in a random manner into two batches of different size but of uniform make-up.

3. The combination claimed in claim 2, in which the uppermost deflecting plates is provided with a plurality of upwardly extending projections adjacent its periphery.

GEORGE V. HERROLD.